Figure 1:
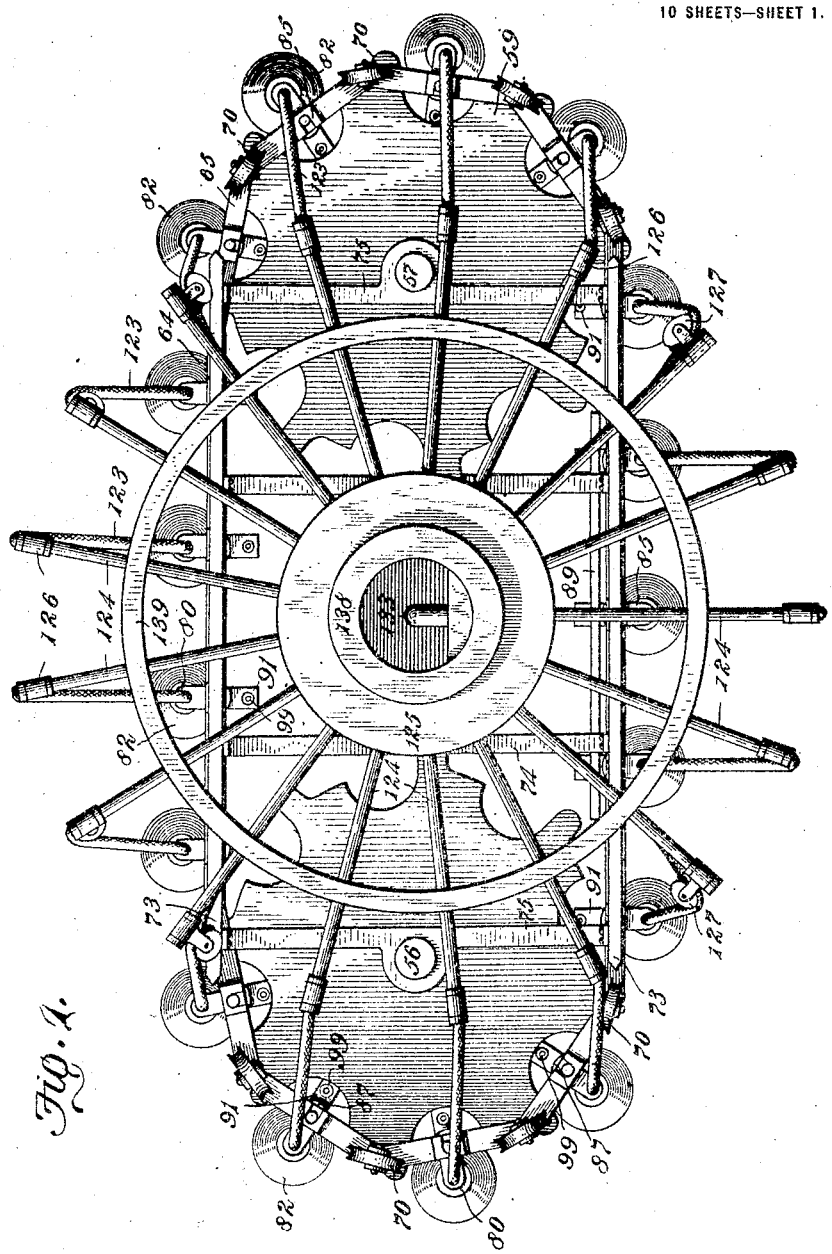

V. M. DORSEY.
GLASS BLOWING MACHINE.
APPLICATION FILED APR. 27, 1907.

1,163,983.

Patented Dec. 14, 1915.
10 SHEETS—SHEET 1.

WITNESSES

INVENTOR

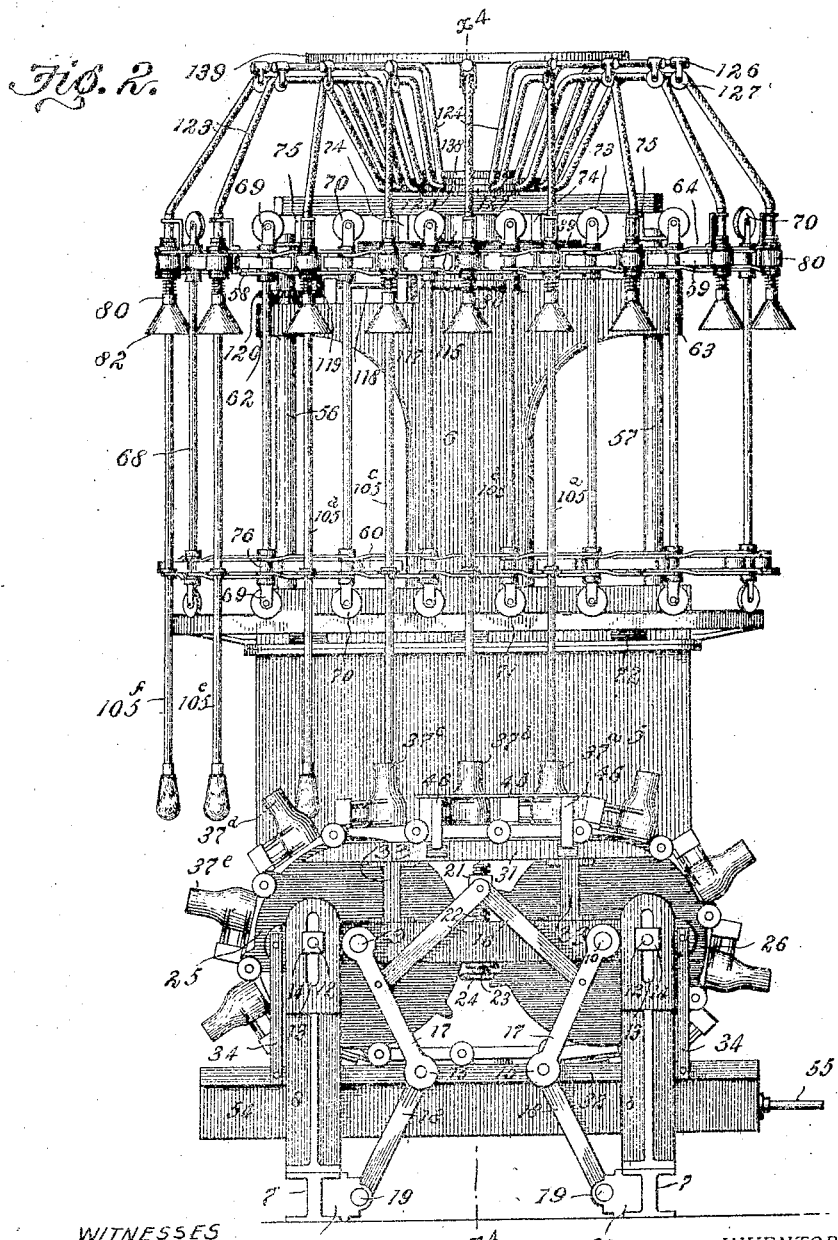

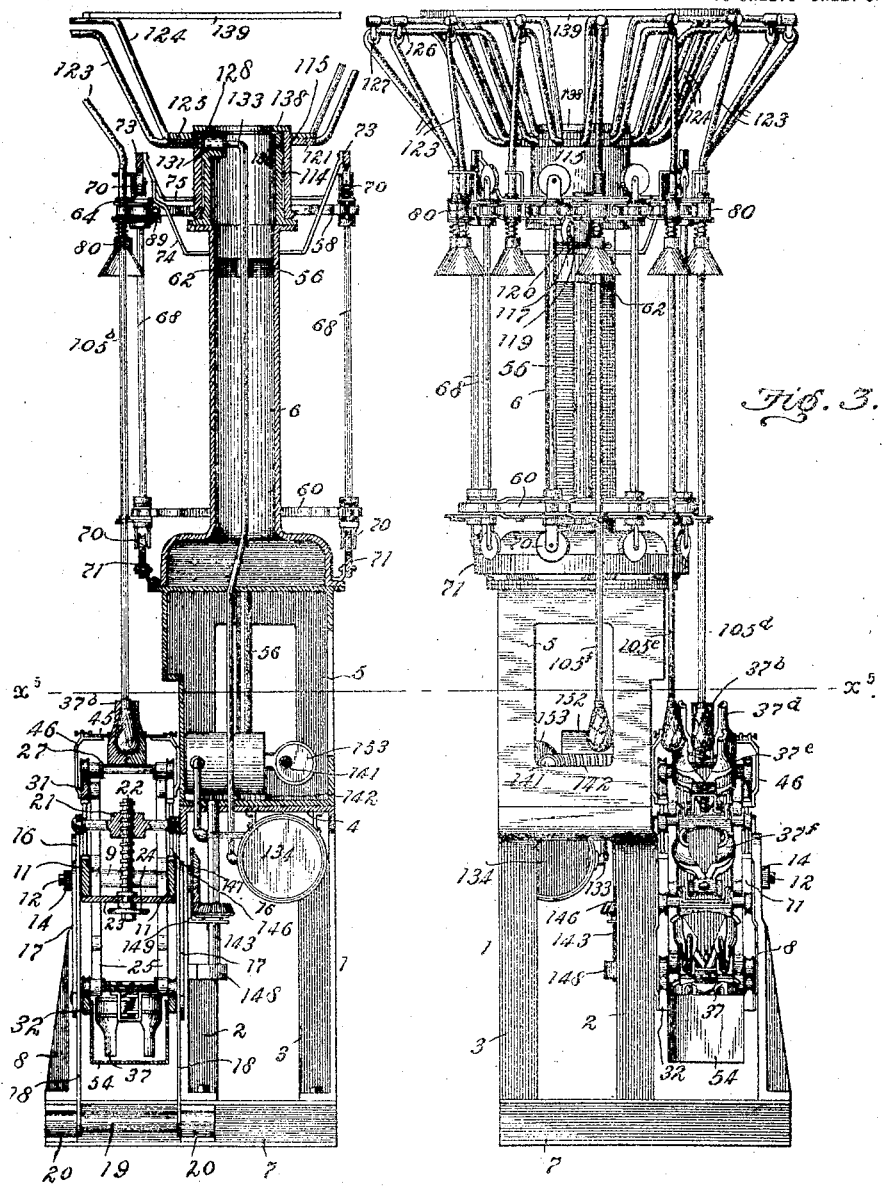

V. M. DORSEY.
GLASS BLOWING MACHINE.
APPLICATION FILED APR. 27, 1907.
1,163,983.
Patented Dec. 14, 1915.
10 SHEETS—SHEET 4.
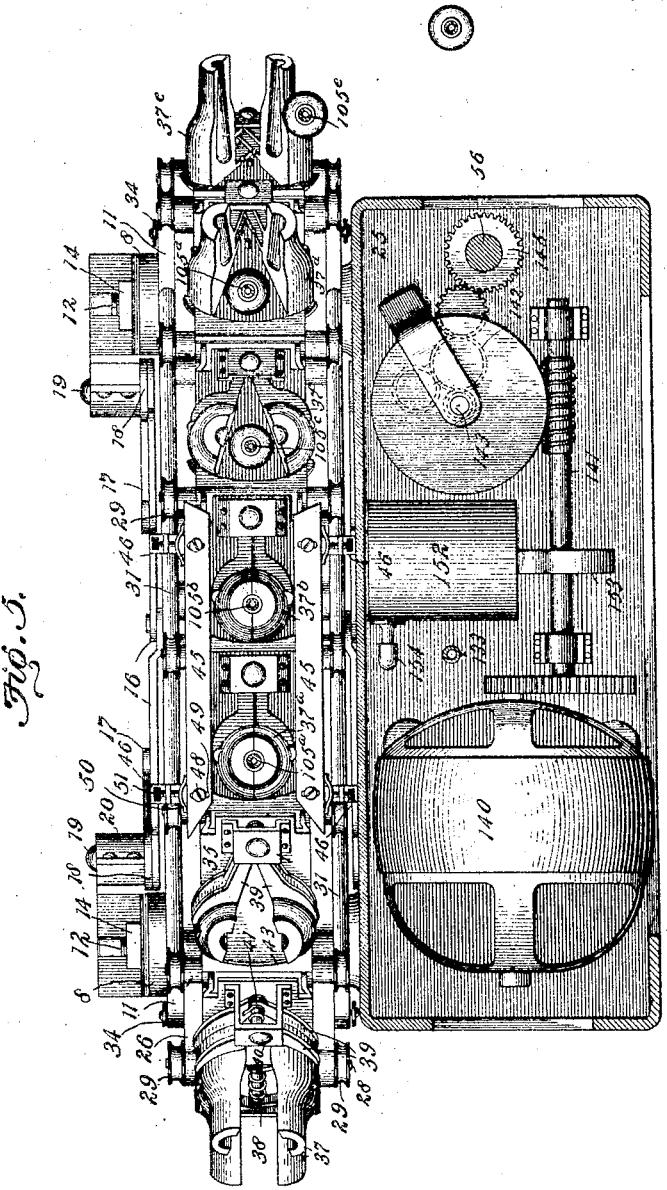
WITNESSES
INVENTOR

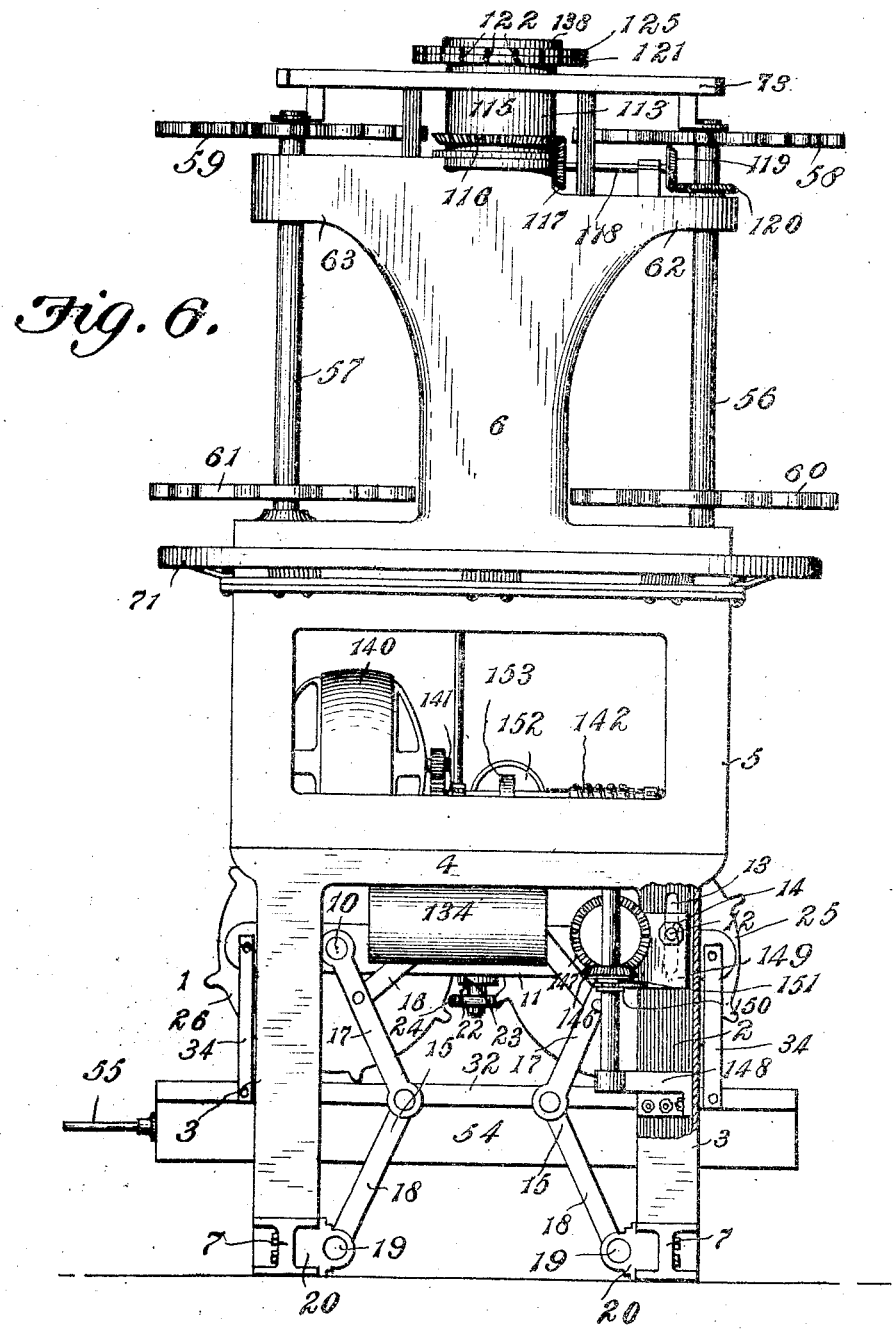

V. M. DORSEY.
GLASS BLOWING MACHINE.
APPLICATION FILED APR. 27, 1907.

1,163,983.

Patented Dec. 14, 1915.
10 SHEETS—SHEET 6.

WITNESSES
J. Howard Bishop.
Frank C. Cole

INVENTOR

V. M. DORSEY.
GLASS BLOWING MACHINE.
APPLICATION FILED APR. 27, 190
1,163,983.
Patented Dec. 14, 1915.
10 SHEETS—SHEET 7.
Fig. 10.
Fig. 11.
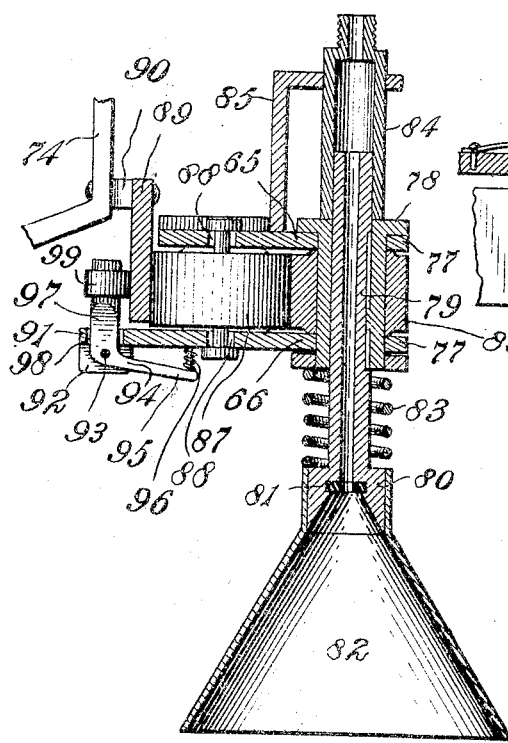
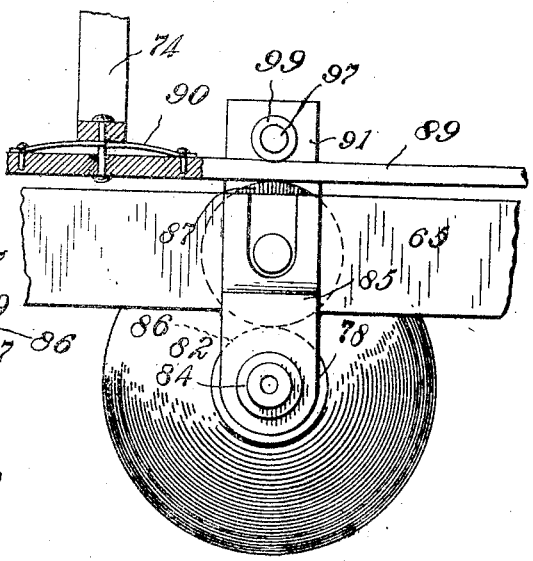
Fig. 9.
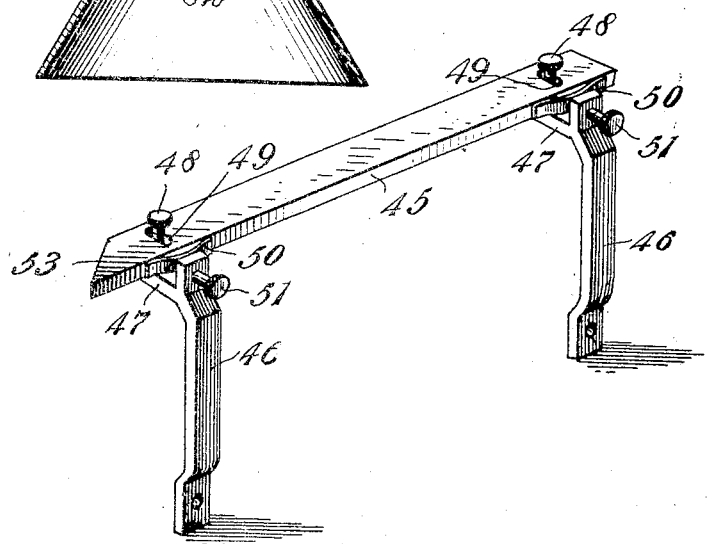
WITNESSES
F. Howard Bishop.
Frank C. Cole.
INVENTOR
Vernon M. Dorsey

V. M. DORSEY.
GLASS BLOWING MACHINE.
APPLICATION FILED APR. 27, 1907.

1,163,983.

Patented Dec. 14, 1915.
10 SHEETS—SHEET 8.

WITNESSES
J. Howard Bishop
Frank C. Cole

INVENTOR

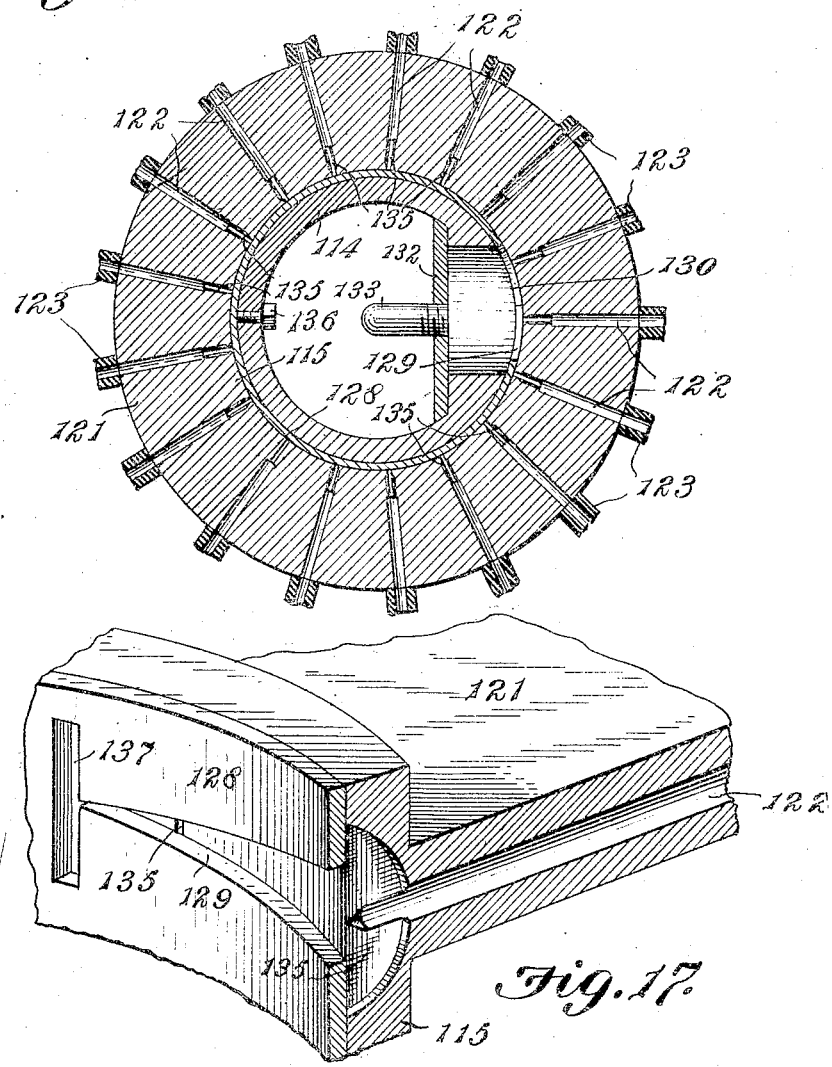

V. M. DORSEY.
GLASS BLOWING MACHINE.
APPLICATION FILED APR. 27, 1907.
1,163,983.
Patented Dec. 14, 1915.
10 SHEETS—SHEET 10.
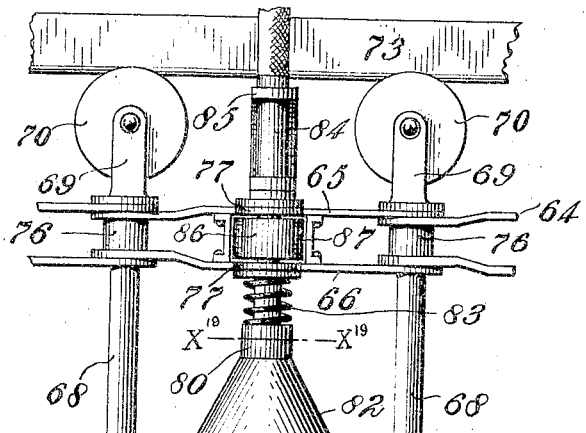
Fig. 18.
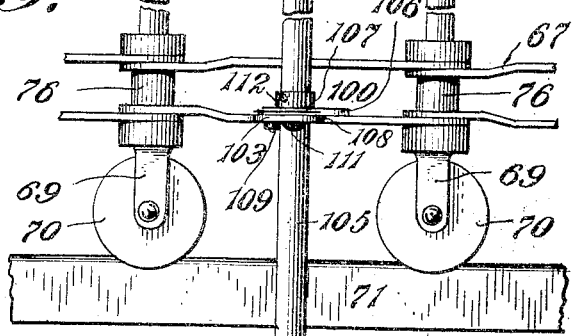
Fig. 19.
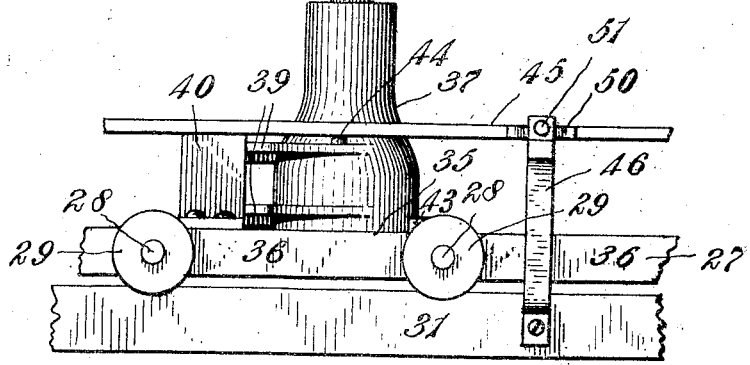
WITNESSES
J. Howard Bishop.
Frank C. Cole.
INVENTOR
V. M. Dorsey

UNITED STATES PATENT OFFICE.

VERNON M. DORSEY, OF LAUREL GROVE, MARYLAND, ASSIGNOR TO EMPIRE MACHINE COMPANY, OF PORTLAND, MAINE, A CORPORATION OF MAINE.

GLASS-BLOWING MACHINE.

1,163,983.

Specification of Letters Patent.     Patented Dec. 14, 1915.

Application filed April 27, 1907. Serial No. 370,593.

*To all whom it may concern:*

Be it known that I, VERNON M. DORSEY, a citizen of the United States of America, and a resident of Laurel Grove, St. Marys county, State of Maryland, have invented certain new and useful Improvements in Glass-Blowing Machines, of which the following is a specification.

My invention relates to that class of glass-blowing machines which are adapted to receive a blow-pipe on which the glass has been gathered and has received such preliminary treatment as may be necessary, and which are provided with mechanism actuated by the movement of the machine, for closing the molds, for imparting a rotary motion to the blow-pipes in respect to the molds, for opening the molds, and for admitting air under pressure to the interior of the article to be blown at such times as it may be necessary.

For this purpose it consists of an organization of such a machine in which the molds travel in a vertical plane, the lower part of the path of the molds being utilized to dip them in water and the upper part of their path being that in which the molds are closed; and in which the blow-pipes travel in a horizontal plane, their path of movement coinciding for a certain distance with the path of the molds. This is effected by placing the molds upon an apron carried by horizontal shafts whereby a straight run is provided for the molds above such shafts, while the blow-pipes are adapted to be received by an apron carried by vertical shafts, a part of the run of the blow-pipes carried by the apron being located above the upper run of the molds. With the mold-apron is associated mechanism for automatically closing the molds at the commencement of their upper run and for automatically opening them at the termination of their upper run, while with the blow-pipe apron is associated mechanism for rotating the blow-pipes when above the mold apron and for admitting air under pressure to the blow-pipes at such time.

Means are further provided for varying the vertical relation of the mold and blow-pipe aprons whereby blow-pipes of various lengths may be interchangeably used or molds of different heights employed.

The invention further consists in details of construction whereby the general form of machine above pointed out is adapted and perfected for use; and in the construction, combination, and arrangement of the several parts of which it is composed as will be hereinafter more fully described and claimed.

Figure 7:
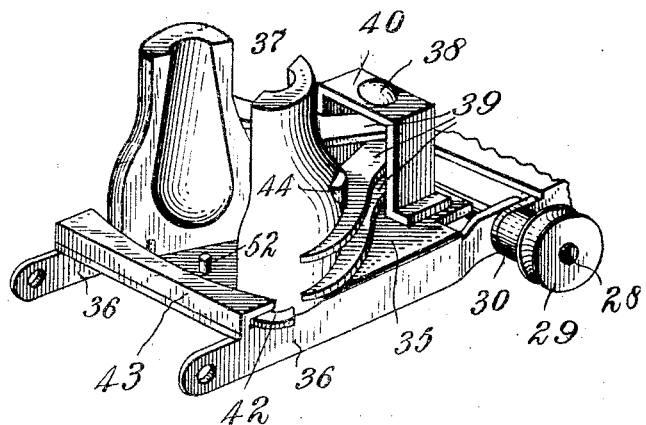
Figure 8:
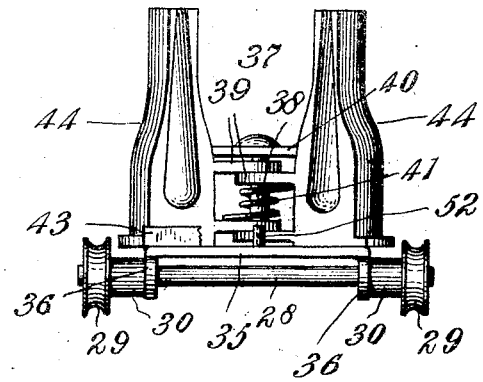
Figure 12:
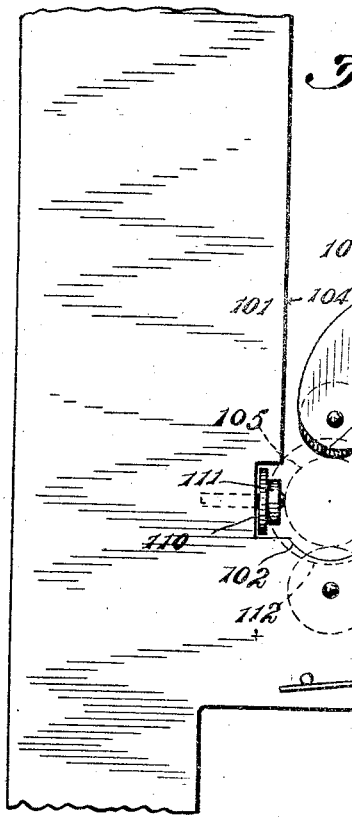
Figure 15:
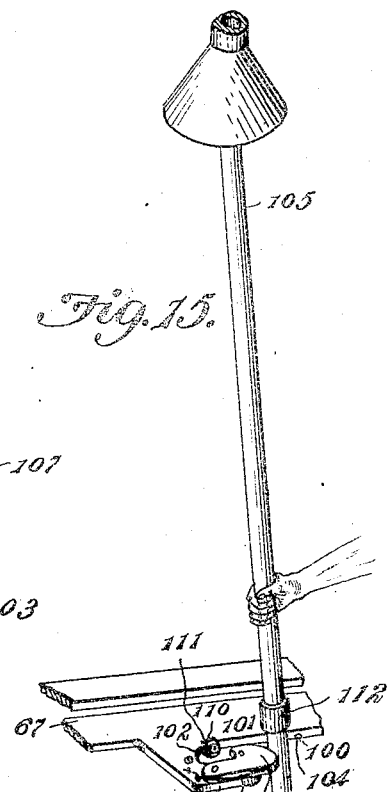
Figure 13:
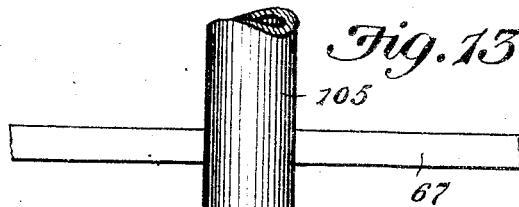
Figure 14:
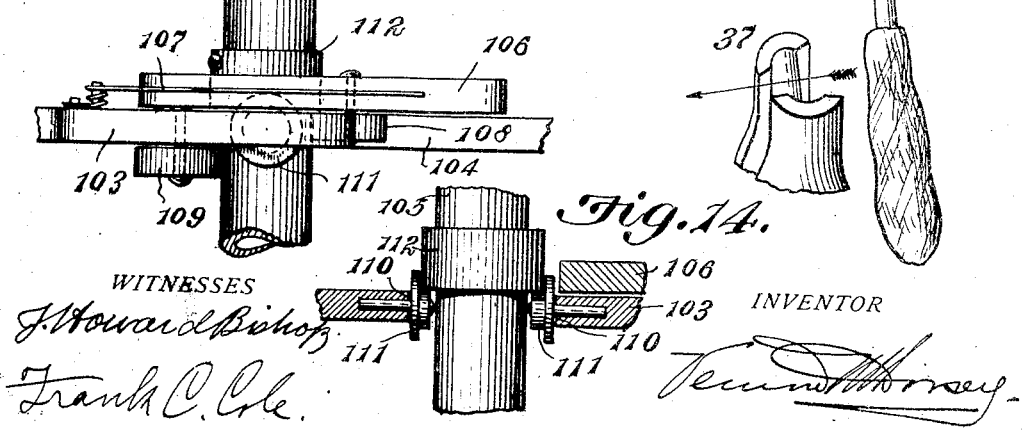

Referring to the accompanying drawings in which corresponding parts are designated by corresponding marks of reference: Figure 1 is a plan of the mechanism comprised in the blow-pipe system of the machine forming the subject matter of this invention. Fig. 2 is a front elevation of a machine constructed in accordance with this invention. Fig. 3 is an end elevation of the machine shown in Fig. 2, looking at the delivery end of the machine. Fig. 4 is a vertical section on lines $X^4 X^4$ of Fig. 2. Fig. 5 is a horizontal section on lines $X^5 X^5$ of Figs. 3 and 4. Fig. 6 is a rear elevation showing the frame of the machine. Fig. 7 is an enlarged perspective of a mold element. Fig. 8 is a rear end elevation of the parts shown in Fig. 7, with the plate partly broken away. Fig. 9 is an enlarged detailed perspective of the mold closing plates. Fig. 10 is a vertical section through a blow-pipe chuck. Fig. 11 is a plan of the part shown in Fig. 10. Fig. 12 is a plan of the blow-pipe support. Fig. 13 is a front elevation of the part shown in Fig. 12 with a blow-pipe in place. Fig. 14 is a detailed vertical section through a blow-pipe support. Fig. 15 is a detailed perspective, illustrating the manner in which a blow-pipe is inserted in the machine. Fig. 16 is a horizontal section taken through the air-distributing head. Fig. 17 is a perspective showing the relation existing between the perforated and slotted sleeve and the slotted collar of the air-distributing box. Fig. 18 is a side elevation of one blowing and one molding element. Fig. 19 is a horizontal section through the chuck shown on line $X^{19} X^{19}$ of Fig. 18.

The machine forming the subject matter of this application consists of two systems, one comprising the blow-pipe supports and mechanism, and the other comprising the mold supports, the molds, and the opening and closing mechanism of the molds. These two systems are independent and the only functional connection between them is created by the blow-pipes carried on those of the blow-pipe supports which from time to time come into line with the corresponding molds. While a mechanical connection is shown in the drawings as existing between the two systems, in a drive mechanism, such last named connection merely exists for convenience in causing an absolute uniformity of motion in the two systems, and could be replaced by an independent drive for each of the systems provided the prime motors thereof are such as to maintain a regular and identical speed in the parts driven.

The blowing system, as before stated comprises a plurality of supports moving in a non-circular closed path in a horizontal plane, a part of such path being a tangent, or straight, combined with mechanism whereby air under pressure is admitted to the blow-pipes carried on such supports during all or part of their travel on the tangent, and whereby the blow-pipes are rotated on such part of their travel. The supports may describe any desired path in addition to the tangent before named, but for convenience in construction, their whole path preferably consists of two tangents connected by two curved portions. That straight part of the path of the blow-pipe supports in which the blowing takes place, will for convenience be designated herein as the blowing path, although the blowing may not continue during the entire travel in such path. The blow-pipe supports in the embodiment shown project horizontally from the face of an apron, whose face is vertical, the apron being carried by sprocket-wheels having vertical axes and rotating in horizontal planes.

The mold system travels in a vertical plane having the upper part of its run straight or a tangent and beneath the blowing run of the blowing system. While the character of the remaining part of the run of the mold system is not essential, for convenience it preferably consists of a straight return portion connected at its ends to the upper straight run (which is herein called the blowing run) by curved paths. In the embodiment of the invention herein shown the mold system comprises an apron having a horizontal face, carried over opposite sprocket-wheels, the axes of which are horizontal, and which rotate in vertical planes. The apron has projecting from the face thereof sectional molds, which are preferably of the paste type and are opened by suitable springs, and closed by mechanism arranged adjacent to the blowing run, and which on their lower horizontal run may be wetted by traveling through a suitable bath, for which reason the lower run of the molding system is herein called the wetting run. The two systems with the sprockets by which they are carried, are mounted in a suitable rigid frame or structure which is self-contained in that it contains within itself, the proper driving mechanism and air supply; and one of the systems as a whole (in the form shown, the mold system) is movable vertically to accommodate the machine to different heights of molds and different lengths of blow-pipes.

*The frame.*—The supporting mechanism consists of an upright frame, preferably composed of three castings, and an extension for the support of the molding system. The lower casting 1 of the frame constitutes a base and is provided with legs 2 and 3 connected by a bed 4, and carries a box 5, forming a housing for the driving mechanism and air-compressor, which in turn supports the bracket 6 carrying the vertical shafts of the blowing system. The legs of the base casting rest upon girders 7, which project outwardly therefrom to what may be called the front of the machine, and support at their outwardly projecting ends standards 8.

*The mold system.*—The horizontal shafts 9 and 10 of the mold system are supported in and held apart by radius bars 11, one on each side of the path of movement of the mold apron. Each of these bars has a stud 12 on each of its ends and on that face thereof which is the outward one in respect to the apron. These studs are contained and guided in slots 13 in the standards 8 of the mold supporting frame and the front legs 2 of the base 1 of the casting, and are adapted to be firmly held in position therein by means of clamp nuts 14, whereby the height of the radius bars may be changed by loosening the nuts and sliding the studs within the slots, and as a means whereby the radius bars and parts carried thereby may be easily raised and lowered to effect this change, a system of toggles is provided. This system consists of a vertical toggle 15 for each end of each of the radius bars, and a pair of horizontal toggles 16 for straightening the links thereof. The upper links 17 of the vertical toggles have their upper ends journaled on the horizontal shafts 9 and 10 and the corresponding lower links 18 are in the form of arms projected from shafts 19 journaled in bearings 20 carried on the girders 7, the shafts 19 projecting beneath the run of the mold-apron, whereby the toggles 15 at the same end, but on opposite sides of the run, are caused to move in unison. The vertical toggles each break toward the center and are thus oppositely faced, and for the purpose of controlling their movement, the upper links 17 thereof on each side of the apron are connected by a horizontal toggle 16, the knuckles of the horizontal toggles on the opposite sides of the run being connected by a trunnioned nut 21 extending above the radius bars, and receiving between them a worm 22, carried by a cross plate 23 extending from one bar to the other, and provided with a hand wheel 24, whereby the vertical position of the nut may be altered and thus the horizontal toggles straightened or broken, which will cause a corresponding change in the position of the vertical toggles, and thus cause the radius bars to be raised and lowered in unison, and maintain them horizontal during such change in elevation.

The horizontal shafts 9 and 10 have mounted thereon between the radius bars, sprocket-wheels 25 and 26, respectively, over which travels the mold-apron 27, consisting of a number of elements journaled and connected together by axles 28, which have upon their projecting ends, supporting rollers 29. Collars 30 surround the axles inside of the rollers, the teeth of the sprocket-wheels engaging the collars, while in order to more accurately guide the apron on the tangents, the supporting rollers are preferably curved and run on tracks 31 and 32 having a rounded upper contour to conform thereto, the tracks being supported from the radius bars, the upper track 31 by brackets 33 and the lower track 32 by links 34.

Each element of the mold-apron consists of a platform 35 carried on a pair of links 36 and by preference the platform and links are made integral by stamping from sheet metal, the links being formed by flanges struck down from the side edges of the platform and extending slightly beyond the ends of the same. The links thus formed are at one end bent in toward the center to a distance equal to their thickness and are bored at each end to receive the axles 28, the collars 30 surrounding the axles serving to hold the platforms centrally thereon and to space the rollers 29 at a fixed distance on each side of the platform.

Located on the platform of each element of the apron is a sectional mold 37, consisting of two parts which are pivoted by a vertical pin 38 extending through forwardly projecting arms 39 on the mold parts, and carried by a bracket 40 arising from the front end of the platform 35, a coiled spring 41 encircling the pin and having its opposite ends engaging the arms of the opposite mold parts and tending to throw them apart, the limit of movement of the parts being such as to permit, when the molds are fully open, the blown article to be moved from the interior cavity of the mold by a movement in the plane of division of the mold. Each mold part has upon its base, at the rear thereof, an ear 42, which slides between the platform of the element on which it is mounted and a plate 43 supported a slight distance above the same, the face of the plate adjacent to the mold being struck from the center around which the mold parts move in opening. While the molds are all similar and are generically designated in the drawing by the reference characters 37, I have for the purpose of identifying the several molds in the different figures, further specialized the designation thereof by alphabetical exponents.

Each mold part is provided upon its side with a boss 44, which bosses with coöperating plates 45 located on each side of the blowing run of the mold-apron, constitute means for closing the molds on such runs and holding them closed. The plates 45 are carried by brackets 46, arising from the upper mold-apron track 31, and having horizontal extensions 47, on which the plates rest, the parts being loosely secured together by bolts 48 passing through slots 49 in the plates. The plates are normally projected toward the center of the apron by means of springs 50, which are adjustable by screws 51, the springs causing the plates to fully close all the molds as they pass therebetween, even though they should vary somewhat in size. Each of the mold parts is prevented from passing the center line of the mold-apron by means of a stud 52 carried on the platform of each mold element. Those ends of the plates which are toward the point at which the molds enter the blowing run have inclined faces 53, up which the bosses on the molds slide to effect the closing of the molds, the opposite ends of the plates terminating abruptly, whereby the molds are permitted to be quickly opened at that point by their springs 41.

As by preference the molds are paste molds and require wetting between blowings, a water tank 54 is supported from the lower mold track 32, the contents of the tank being if desired, heated by means of a steam pipe 55 projecting therein.

It will be noted that the horizontal shafts 9 and 10, the sprocket-wheels 25 and 26 thereon, the upper and lower mold tracks 31 and 32 and the mold-closing plates 45 supported from the former, and the water tank 54 supported from the latter are all carried by the radius bars 11 and may have their vertical positions altered therewith by the toggle system before described.

*The blow-pipe system.*—The blow-pipe system revolves around two vertical shafts 56 and 57 placed at a distance apart slightly greater than the distance separating the horizontal shafts 9 and 10, the vertical plane in which the vertical shafts are located being displaced laterally to one side of the center line of the blowing run of the mold system. The vertical shafts carry upper sprocket-wheels 58 and 59 respectively and lower sprocket-wheels 60 and 61 respectively, and are supported at their upper ends in bearings located in the opposite horns 62 and 63 of the bracket casting 6, and at their lower end in bearings in the base of such casting, the upper and lower sprockets being above the upper faces of the top and bottom horns, respectively of each casting. Around the two upper sprockets extends a belt 64 formed by a plurality of elements, each consisting of pairs of links 65 and 66, one end of each link being brought toward the center line of the belt formed thereby to a distance equal to the thickness of the link itself. A similar belt 67 having the described construction also passes over the lower sprockets and the two belts are connected and formed into an apron by axles 68 extending from and above the upper belt to below the lower belt, the projecting ends 69 of the axles being bifurcated, forming supports for wheels 70, the lower wheels traveling upon a track 71, carried on brackets 72 from the box casting, and lying below the path of motion described by the belts, and the upper wheels upon a similar track 73 carried by brackets 74 from the top of the bracket casting 6 and by brackets 75 sleeved upon the upper end of the vertical shafts 56 and 57 above such path of motion. The lower track supports the apron thus formed and also guides it on its tangent runs, but as the upper track has merely the latter function, it is only coextensive with the tangent runs. The links of each of the belts are separated from each other by collars 76 surrounding the axles and with which the teeth of the sprocket-wheels engage.

The links 65 and 66 of each element of the upper belt have each an ear 77 projecting from the outer face thereof. A bushing 78 connects these ears and is mounted for rotation therein, and through it extends a tubular stem 79 splined thereto and capable of vertical motion therein. Each of these stems has its lower end terminating in a hollow chuck 80, the interior of which is conical and preferably polygonal and has a packing 81 at its smaller end. The chucks which are continued downwardly by conical deflectors 82 are projected downwardly by coiled springs 83 interposed between their upper faces and the lower ends of the bushing. The tubular stems 79 above the bushings are received in tubular extensions 84, in respect to which they are capable of rotation and vertical motion, such extensions being guided and held rigidly in place by brackets 85 arising from the upper faces of the upper links 65 of the belt.

Between the ears 77 on the two links the bushings 78 have each secured thereto a friction-driven pulley 86, and between the webs of the links a friction-driving pulley 87 is mounted in slots 88 transverse to the length of the links. Adjacent to the blowing run of the apron and inside of and at the level of the upper belt thereof is located a friction plate 89 supported from the brackets 74 carrying the upper track, the plate being mounted from the brackets in such a manner as to permit a slight movement to and from the plane of motion of the belt, being projected toward such plane by leaf springs 90 interposed between it and the brackets.

Each of the lower links 66 of the upper belt has lugs 91 projecting inwardly from the middle thereof, the edges of said lugs being bent down to form bearings 92 for a pin 93 on which is pivoted a crank arm 94, the horizontal member 95 of which projects outwardly in respect to the links and is pressed downwardly by a coiled spring 96 interposed between it and the lower surface of the web of the link, the vertical arm 97 of the crank projecting upwardly through a slot 98 formed in the lug and carried on this upper end, a friction roller 99 so located that it will be by the travel of the apron brought behind the friction plate 89, clamping it against the friction-driving pulley 87, and at the same time pressing the friction-driving pulley against the friction driven pulley 86, whereby the rotation imparted to the former as it rolls along the plate, due to the movement of the belt, will be imparted to the latter, thus rotating the chuck splined therein.

The lower belt at points vertically below the projections of the upper belt carries blow-pipe supports 100, these supports consisting of plates 101 fastened to the lower link of said belt and projecting outwardly therefrom or of projections on the links themselves. At points vertically below the chucks carried by the upper belt, the plates are provided with slots 102 the ends of which open rearwardly in respect to the direction of motion of the apron. The slots are located in the angle of an off-set 103 formed on the plates. so that the inner walls of the slots are continued for some distance in the rear of the mouths thereof by the outer edges 104 of the plates 101, thus affording guides for the insertion of the removable blow-pipes 105, the lower ends of which, the operator, by thus pressing the central portion against the edge of the plate at the rear of said off-set portion, will locate in the plane of the center of the molds. Above each plate and adjacent to the slot is pivoted an arm 106 pressed by a spring 107 in a forward direction and provided on its lower face with a roller 108, whereby the blow-pipe when inserted in the slot will be held by a resilient pressure toward the forward end thereof, and at the same time the friction created by the rotation of the blow-pipe will be taken up by such roller. For the purpose of taking up friction between the blow-pipe and the plate, a roller 109 is located at the closed end of the slot. Each blow-pipe support has recesses 110 formed in the side walls of the slot therein in which are pivoted vertical flanged rollers 111, upon the peripheral treads of which the lower face of collars 112, preferably adjustably secured on the removable blow-pipes are adapted to rest, the periphery of such collars setting within the flanges of such vertical rollers. By this construction the weight of the blow-pipe is carried by the vertical rollers, and rotation of the latter is made easy, due to the elimination of sliding friction, while the horizontal rollers, and the flanges of the vertical rollers center the blow-pipes against lateral strain.

While the removable blow-pipes are all similar, and are designated in the drawings by the reference character 105, I have for the purpose of identifying the several blow-pipes in the different figures, further specialized the designation thereof by alphabetical exponents.

It will be seen that the blow-pipe apron, like the mold apron, consists of a number of elements, each of these elements consisting of a section of the upper and of the lower belts with the connecting axles and wheels, with a blow-pipe chuck carried in the upper belt, and a blow-pipe support carried on the lower belt, the parts being so located that the blow-pipes carried by the apron will be caused by the travel thereof on the blowing run, to move in the vertical plane in which are located the centers of the molds, and so that the axes of each blow-pipe carried by the chucks and blow-pipe supports will coincide, when the mold apron and the belt apron are driven at the same speed, with the axes of the corresponding molds between the points at which the molds close and open.

Located centrally on the upper end of the bracket casting is the air distributing box 113. This consists of a cylinder 114, forming a bearing for a sleeve 115 having upon its lower end a beveled gear 116 meshing with a corresponding pinion 117 upon a horizontal shaft 118 mounted on one horn 62 of the bracket casting 6, such horn being depressed to permit the horizontal shaft to lie below the upper sprocket 58 on the vertical shaft 56 by which it is driven through a beveled pinion 119 and a beveled gear 120, the gearing being so proportioned that the sleeve makes a complete revolution for each complete revolution of the apron belt due to the rotation of the sprocket. The sleeve has around its upper part a flange 121 in which is bored a number of equally spaced perforations 122, equal in number to the chucks carried by the apron. The outer ends of these perforations are tapped to receive couplings connected to air-pipes 123, the opposite ends of which are connected to the tubular extensions 84, of the chucks. As a part of each of the air-pipes is necessarily flexible due to the fact that they describe a circular path, whereas the chucks to which they are attached move in a non-circular path, the pipes are supported above the level of the chucks by means of spider arms 124, projecting from a central hub 125 resting on the flange 121. The arms are bent upwardly from their central ring and have swiveled on their ends collars 126 carrying rounded blocks 127 over which the flexible pipes lead. In the drawings these rounded supporting blocks are shown in the form of pulleys but this is not essential as their function is not to permit a travel of the pipes thereover, but is merely to guide the curvature thereof and prevent kinking. The arms are of a length approximately equal to the arithmetical mean of one-half of the major and minor diameters of the figure described by the path of the blow-pipes, and thus alternately have their ends located within such path and beyond the same so that at times the flexible pipes project inwardly from the ends of the arms and at other times project outwardly therefrom, in leading to the chuck extensions.

Due to the different paths described by the ends of the arms and chucks, the relative distance between such parts when projected on a horizontal plane varies and for the purpose of reducing to a minimum the slack or difference in length produced thereby, the arms terminate at some distance above the top of the chucks whereby the distance between the chucks and the ends of the arms is not merely the horizontal projections of their displacement but is the hypotenuse of a triangle, the base of which is such displacement and the altitude of which is the elevation of the ends of the arms above the chucks. As the hypotenuse of triangles of equal height and of different bases relatively small in comparison with the height vary but slightly, it will be seen that by this means I have provided for a substantially uniform distance between the ends of the spider arms and chucks.

The upper end of the cylinder 114 is slightly reduced in diameter to receive a collar 128 which has a slot 129 therein, and the cylinder itself has on the side adjacent to the blowing run a port or chamber 130 formed therein, which is closed by a plate 132 suitably tapped to receive an air supply pipe 133 which leads therefrom through the center of the bracket casting to the air pressure equalizing tank or reservoir 134, which may be located in the base of the machine.

The perforations 122 in the flange 121 are located in the same horizontal plane as the port 130 and slot 129 in the collar, but do not extend to the inner face of the sleeve, being connected therewith by narrow slots 135, the thickness of which is several times less than that of the diameter of the perforations, and which bisect the perforations for a length equal to several diameters thereof. The collar does not rotate in respect to the cylinder 114 in the operation of the machine but, is capable of circumferential adjustment therearound, a locking bolt 136 being provided in the cylinder for this purpose. The sleeve is rotated by the gearing before described around the cylinder and around the collar fixedly mounted thereon, so that the slots 135 in the former will be successively brought past the elongated slot 129 in the collar and past the port in the cylinder registering therewith. This will take place with each perforation and its slot 135 at the time when the chucks connected therewith by its air-distributing pipe and on the blowing run of the belt apron. During the movement of the chucks on such run air will flow through the chamber or port 130 in the cylinder, slot 129, and through the slots 135, etc. to the chucks connected respectively therewith, and will thus enter the interior of the blow-pipes which are carried by such chucks and thus inflate the glass carried by the blow pipes. As the collar is removable it may be changed from time to time to accommodate the slot therein to the character of the article blown and demands thereof for different air-pressures and air regulation. By preference the slot 129 in the collar will be triangular in shape, its narrow end being that end which is first uncovered by the slots 135 in the sleeve in the rotation of the latter, whereby the pressure created in the blow-pipes will be gradually increased; and by preference this triangular slot will terminate at its narrow end in a cross slot 137 whereby a comparatively strong initial blast of air will be created in the blow-pipes.

It is obvious that by altering the circumferential position of the collar 128 the initiation and termination of the blowing operation in respect to points in the blowing path of the blowing apron may be varied; and that by replacing one collar by another any desired or required variation in the air supply may be obtained.

The sleeve is held upon the head by means of a bolted flange 138, and for the purpose of strengthening the spider arms against the stresses due to the weight of the distributing pipes their radial portions are preferably connected by a horizontal annulus 139, which not only serves to prevent side displacement thereof but also to balance the weight of one arm against that opposite thereto.

*Driving mechanism:*—A suitable motor 140, preferably electric, is contained within the interior of the box casting 5, and drives through a horizontal counter-shaft 141, and worm and speed reducing gearing 142, the gear 145 upon the lower end of that vertical shaft 56 which carries the sprocket wheels around which the blowing-apron passes when leaving the blowing run, which shaft for this purpose is continued through the bracket-casting and has a footing in the bottom of the box casting. As the other shaft of the blowing-apron is not driven it may terminate in the base of the bracket casting.

The vertical countershaft 143 has splined thereon below the bracket casting a beveled pinion 146 meshing with the beveled gear 147 on the corresponding horizontal shaft 9 of the mold system, the lower end of the countershaft being carried in a bracket 148 secured to a leg 2 of the base casting. A plate 149 mounted on the outer end of the stud 12 of the radius bar 11, which projects through the slot in the same leg, has a forked horizontal extension 150 engaging a groove 151 in the slot of the beveled pinion 146, and holds the latter in mesh with the gear 147, and guides it to preserve such mesh, as the radius bars and with them the horizontal shaft 9 are raised and lowered.

A suitable air-compressor 152 is located in the box casting and the piston thereof is driven by an eccentric 153 mounted on the horizontal countershaft 141, the compressor being connected with the air tank 134 by a suitable pipe 154.

In the operation of a machine so constructed, the operator having gathered and marvered a batch of glass upon a blow-pipe places the upper end of the latter in one of the chucks, the cone-shaped deflector 82 thereon, serving as a guide for him in this movement. He then slips the intermediate part of the blow-pipe below the collar thereon into the blow-pipe support, the straight edge 104 of the support serving as a guide for him in this movement and as a means of maintaining the blow-pipe at such times in the plane of movement of the center of the molds. Each chuck will be loaded at a point in the blowing run of the belt apron at which the mold corresponding to the chuck is just on the point of closing, it being open at such time. The movement of insertion being in the plane of movement of the center of the molds and being guided in this plane by the edge of the support, there will exist no danger of marring the finished product by touching the molds with the glass, and thus I am permitted to load the machine while running. The blow-pipe having been inserted in the machine the subsequent operations are purely automatic. The movement of the mold in the blowing run causes the closing thereof, while the simultaneous travel of the blow-pipe causes the rotation thereof, and the air is admitted. The molds before they leave their horizontal path, are opened by their springs. freeing the finished article which remains suspended on the blow-pipe and is by the movement thereof carried away from over the mold-apron. The blow-pipe with the finished product thereon may now be removed at any desired point of travel of the blow-apron.

It will be noted that in loading a machine such as above described, the insertion of the blow-pipe within the mold takes place in the line of movement of the mold itself, so that the operator has simply to insert the blow-pipe in a straight line. This is an important feature, as in any machine in which the insertion of the blow-pipe is at right angles to the line of movement of the mold, the operator is called upon to move the blow-pipe with a compound movement, that is to say, not only to bring the blow-pipe within the mold but to center it therein by following the mold in its movement, which is difficult and often results in the glass upon the blow-pipe striking the sides of the mold, thereby imparing the finished article.

It will be noted that only one of the vertical and one of the horizontal shafts are driven, these shafts being those located at the delivery end of the blowing path of their respective systems. Thus the friction and the inertia of the aprons will maintain them taut at all times, and as the sprocket-wheels of the two systems are by preference identical in pitch radius and number of teeth, and are driven in synchronism, and as further by preference the driving sprockets of the two systems are similarly positioned at the same time (that is to say that the teeth thereon are similarly located in respect to the blowing run) it will be seen that at each instant the speed of the elements of the blowing-apron in its blowing run will be the same as the speed of the elements of the molding-apron on such run.

While the pitch radius of the sprocket-wheels of the two systems and lengths of the elements of the belts thereof are preferably identical, it does not follow that this should be true of the number of elements in each system. On the contrary it is advisable, as is shown in the accompanying drawings, to use a greater number of elements in the blowing system than in the molding system, so that the tangent of the former is of greater length than the tangent of the latter, as thereby the molds are raised to the level of the lower ends of the blow-pipes; and are lowered from such level while the corresponding blow-pipes are traveling in their straight path. After the molds have fallen below the level of the articles carried by the blow-pipes, the latter will move upon their circular path and out of the vertical molding plane without causing them to interfere with the molds, which would be the case if the number of elements in the two systems were the same or if the shafts lay in the same plane, as in the latter case the blow-pipes would start their movement in a circular path in a horizontal plane at the same time that the molds start to move in a circular path in the vertical plane, the result of which would be that the blown article would strike the tops of the molds before the latter had fallen sufficiently to clear them.

Having thus described my invention, what I claim and desire to secure by Letters Patent is:—

1. In a glass-blowing machine, the combination of a mold-carrying mechanism, continuously traveling in one plane and a blow-pipe carrying mechanism continuously traveling in a plane at right angles thereto.

2. In a glass-blowing machine, the combination with a mold-carrying mechanism, continuously traveling in a vertical plane, of a blow-pipe carrying mechanism continuously traveling in a horizontal plane.

3. In a glass-blowing machine, the combination with molds moving in a vertical plane, of blow-pipe supports movable in a horizontal plane, portions of the path of movement of the molds and supports being the intersection of the said planes, and means for moving the mold and blow-pipe supports in unison along such intersection.

4. In a glass blowing machine, a series of blow-pipe supports and a series of molds, each of said series moving in a different non-circular path, parts of which paths are tangents located in the same vertical plane.

5. In a glass-blowing machine, the combination with a series of blow-pipe supports traveling in a closed non-circular path, a part of which is a tangent, of a series of molds also traveling in a non-circular path, a part of which is a tangent, the planes of motion of the molds and blow-pipe supports being at an angle to each other.

6. In a glass-blowing machine, the combination with an apron having a vertical face, of blow-pipe supports carried on said apron, an apron having a horizontal face, and molds on the last named apron.

7. In a glass blowing-machine, the combination with a series of chucks traveling in a non-circular path in a horizontal plane, a part of which path is a tangent, of molds moving in a non-circular path in a vertical plane, a part of which path is a tangent located in the same plane as the tangent in which the chucks travel.

8. In a glass-blowing machine, the combination with a series of tubular chucks traveling in a non-circular path in a horizontal plane, a part of which path is a tangent, of means for admitting air under pressure to the interior of the chucks while on the tangent, and molds moving in a non-circular path in a vertical plane, a part of which path is a tangent located in the same plane as the tangent in which the chucks travel.

9. In a glass-blowing machine, the combination with a vertical apron traveling in a non-circular path in a horizontal plane, a part of which path is a tangent, of chucks mounted on the apron, means for rotating the chucks while on the tangent, a mold-carrying apron moving in a non-circular path in a vertical plane, a part of which path is a tangent located in the same plane as the chucks when on the tangent of the first named apron.

10. In a glass-blowing machine, the combination with a vertical apron traveling in a non-circular path in a horizontal plane, a part of which path is a tangent, of tubular chucks mounted on the apron, means for admitting air under pressure to the interior of the chucks while on the tangent, a mold-carrying apron moving in a non-circular path in a vertical plane, a part of which path is a tangent located in the same plane as the chucks when on the tangent of the first named apron.

11. In a glass-blowing machine, the combination with an apron traveling in a horizontal plane in a non-circular path, a part of which is a tangent, of chucks carried by the apron, means for rotating the chucks and admitting air under pressure to the interior thereof on the tangent, an apron traveling in a vertical plane in a non-circular path, a part of which is a tangent located in the same plane as the chucks when moving tangentially, molds carried on the last named apron, and means for opening and closing the molds on their tangential runs.

12. In a glass-blowing machine, the combination with an apron traveling in a horizontal plane and consisting of two connected belts, of a blow-pipe chuck carried by one belt, a blow-pipe support carried by the other belt, means actuated by the travel of the belt for rotating the blow-pipe chucks, a second apron, molds carried by the last named apron, and means for closing and opening the molds at points along their line of travel.

13. In a glass-blowing machine, the combination with an apron traveling in a horizontal plane, of blow-pipe supports carried by said apron, an apron traveling in a vertical plane, molds carried by the last named apron and means for varying the position of the mold-carrying apron in the plane in which it travels.

14. In a glass-blowing machine, the combination with a vertical frame, of vertical shafts mounted in the frame, wheels carried by the said shafts, an apron carried by said wheels, blow-pipe supports carried by the said apron, horizontal shafts carried in the frame, wheels carried on the horizontal shafts, a mold-carrying apron carried by the last named wheels, and means for varying the elevation of the horizontal shafts.

15. In a glass-blowing machine, the combination with horizontal shafts, of wheels carried thereon, an apron carried by the wheels, molds carried by the apron, means for opening and closing the said molds at points between the shafts, vertical shafts, wheels carried by said shafts, an apron carried by the last named wheels, chucks carried by the last named apron and means for rotating the chucks and admitting air under pressure to the interior thereof while the chucks are between the last named wheels.

16. In a glass-blowing machine, the combination with horizontal shafts, of wheels carried thereon, an apron carried by the wheels, molds carried thereby, means for opening and closing the said molds at points between the shafts, vertical shafts, wheels carried by the said shafts, an apron carried by the last named wheels, chucks carried by the last named apron, means for rotating the chucks and admitting air under pressure to the interior thereof while the chucks are between the last named wheels, and means for driving the aprons in synchronism with each other.

17. In a glass blowing machine, the combination with a frame, of a blow-pipe apron consisting of two link belts connected by axles, wheels guiding the said axles in the frame and means for driving the said apron.

18. In a glass blowing machine, the combination with a frame, of a blow-pipe apron, whose face is vertical, consisting of two link belts connected by axles, wheels guiding and supporting the said axles in the frame, chucks carried by one of the belts, blow-pipe supports carried by the other belt and means for driving the said apron.

19. In a glass-blowing machine, the combination with a link belt having projections thereon, of a chuck carried in the said projection, a friction driving pulley secured on the chuck between the links of the belt and a friction plate adjacent to the path of travel of the belt and driving the said pulley.

20. In a glass-blowing machine, the combination with a link belt, of chucks carried on the said belt, a pulley driving each of the said chucks, a plate adjacent to the travel of the belt, and means for holding the pulley in contact with the plate.

21. In a glass blowing machine, the combination with a link belt, consisting of two series of links, a link of each series having a projection thereon, of a chuck carried in the said projections, a friction driven pulley on the chuck, a friction driving pulley mounted for transverse movement in the links and a friction plate adjacent to the path of movement of the belt and means carried by the belt for pressing the driving pulley upon the plate and the driven pulley upon the driving pulley.

22. In a glass-blowing machine, a blow-pipe support consisting of a plate with an off-set portion and a slot therein, one edge of the slot being coincident with the edge of the said plate.

23. In a glass-blowing machine, a blow-pipe supporting plate, having a slot thereon, a friction roller carried by the plate, a spring pressed arm projecting into the said slot and pivoted to one side thereof, and an anti-friction roller carried by the said arm.

24. In a glass-blowing machine, a blow-pipe support comprising two series of rollers, one of the said series having horizontal axes and receiving the weight of the blow-pipe, and the other series having vertical axes and centering the said blow-pipe.

25. In a glass-blowing machine, and in a blow-pipe support therefor, the combination with a slotted plate, of flanged rollers rotating in vertical planes carried by the said plate, a latch for the slot, and rollers carried by the plate and latch.

26. In a glass-blowing machine, the combination with a traveling mold apron, having a straight run upper path of travel, of molds carried by the said apron, means for opening and closing the molds while on their straight run portion and a bath into which the molds project while on their return portion of their travel.

27. A mold-belt consisting of a plurality of elements, each of which consists of a platform and links formed integral therewith, combined with a sectional mold pivoted upon the platform of each element and a retaining plate secured to the platform and engaging the mold.

28. A mold-belt comprising a plurality of elements, each of which consists of a platform having its sides bent at right angles to form links in combination with the mold carried on the platform of each element.

29. In a glass-blowing machine, the combination with horizontal shafts, of radius bars connecting the shafts, a mold-belt carried by the shafts, and two pairs of toggles attached to the said shafts and means for actuating the toggles.

30. In a glass-blowing machine, the combination with a series of traveling chucks, of a series of traveling molds, a series of blow-pipe supports traveling in unison with the chucks and a series of guides adjacent to the blow-pipe supports and having guiding edges substantially parallel with the direction of movement of the mold.

31. In a machine for the manufacture of blown glass articles, the combination with a traveling mold and its opening and closing mechanism, of a glass-carrying and blowing spindle, a traveling support for the said spindle, the path of movement of the mold and the support being such that at times the support is positioned vertically over the mold and moving in unison therewith, and is at other times located away from the path of movement of the mold.

32. In a glass blowing machine the combination with a mold and its operating mechanism, of a blow-pipe support adapted to receive a blow-pipe to position it in operative position relative to the mold during the blowing and means synchronized in respect to the mold operating mechanism to move the blow-pipe support to remove the blown article away from the mold when the latter is opened.

VERNON M. DORSEY.

Witnesses:
J. HOWARD BISHOP,
FRANK C. COLE.